March 10, 1925. 1,529,166

G. E. CLARK

STRAP FOR MEAT CASKS

Filed Jan. 16, 1924  2 Sheets-Sheet 1

Inventor
George E. Clark

March 10, 1925.　　　　G. E. CLARK　　　　1,529,166
STRAP FOR MEAT CASKS
Filed Jan. 16, 1924　　　2 Sheets-Sheet 2
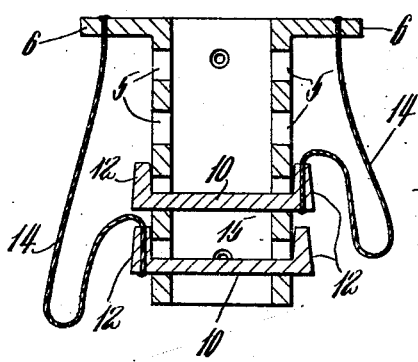
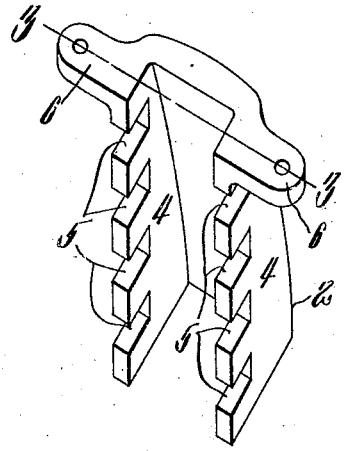
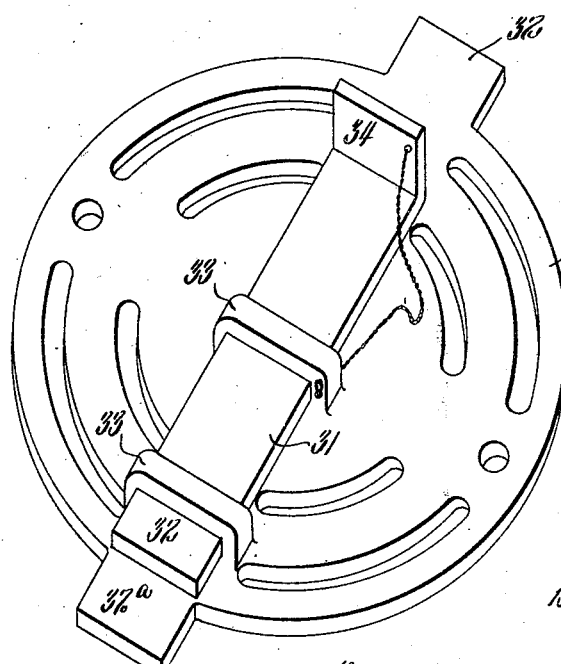
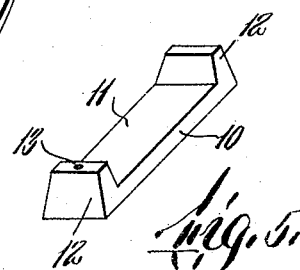
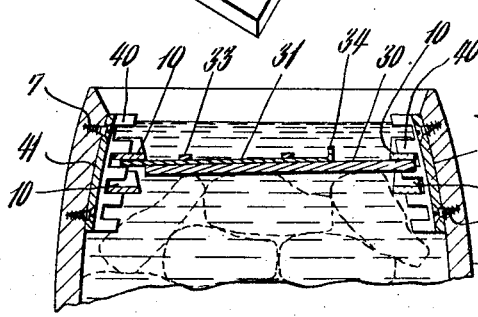
Inventor
George E. Clark Patented Mar. 10, 1925.

1,529,166

UNITED STATES PATENT OFFICE.

GEORGE E. CLARK, OF WATERTOWN, MASSACHUSETTS.

STRAP FOR MEAT CASKS.

Application filed January 16, 1924. Serial No. 686,535.

*To all whom it may concern:*

Be it known that I, GEORGE E. CLARK, a citizen of the United States, residing at Watertown, in the county of Middlesex and State of Massachusetts, have invented new and useful Improvements in Straps for Meat Casks, of which the following is a specification.

In the process of curing many kinds of meat, it is held for some time immersed in brine or other treating liquid. Heretofore this brine, or other liquid, has been contained in casks or hogsheads, the meat being placed therein and held down in the liquid by the use of wood blocks of various shapes and sizes fitted into place to bridge across the container above the meat. A large assortment of these blocks is necessary to suit the individual containers and the shape or other characteristics of the meat contents. These blocks can not be readily kept clean and sanitary and they are liable to become lost. It is also common, when these blocks are used, for portions of the pieces of meat to project above the surface of the liquid, these projected portions becoming prey for rats which are always present in more or less numbers in meat packing establishments. Considerable time is also required to "strap" and "unstrap" the meat when these blocks are used.

This invention, therefore, has for its object the provision of meat strapping devices comprising few parts, easily kept in sanitary condition, and not liable to loss, by which the strapping can be securely accomplished, by which the strapping and unstrapping of the meat may be easily and quickly effected, and by which when the meat is strapped no portions thereof may project above the surface of the liquid.

For a more complete understanding of this invention reference may be had to the accompanying drawings in which—

Figure 3 is a section through a member fixed to the cask showing the retaining blocks in position, the section being taken on line 3—3 of Figure 4.

Figure 4 is a perspective of this member.

Figure 5 is a perspective of the retaining block.

Figure 6 is a perspective of a modified form of presser plate.

Figure 7 is a fragmentary section through the upper portion of a cask showing the plate of Figure 6 in use.

Figure 1:
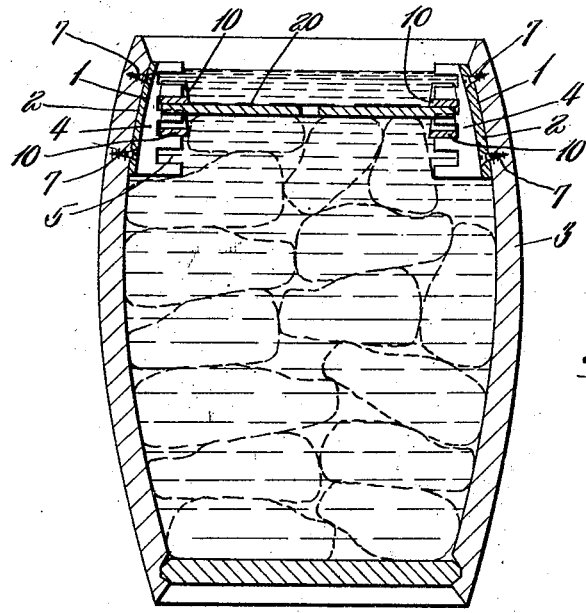
Figure 1 is a central vertical cross section through a cask or hogshead showing the meat strapped therein by the device of this invention.
Figure 2:
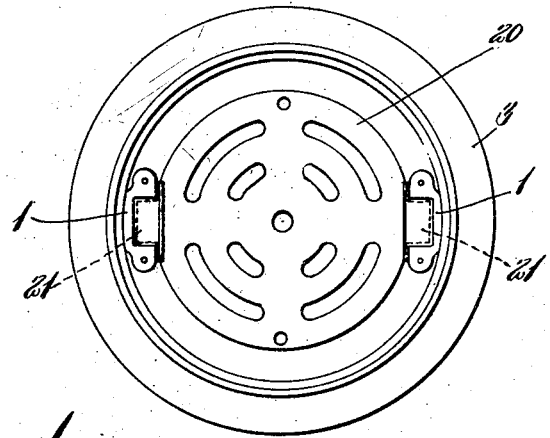
Figure 2 is a top plan of the same.

Referring first to the form shown in Figures 1 to 5, at 1 are indicated in Figure 1, a pair of channel shaped members, one of which is shown detached in Figure 4. Each of these members has a base 2 preferably formed slightly curved to conform to the inner face of the cask or hogshead 3 to which two of these members may be fixed in opposed relation adjacent its upper end. The curved base 2 is formed in this manner since the inner wall of the cask or hogshead is curved, but it is of course evident that if the container were otherwise shaped, the base 2 could be made to correspond therewith. Extending from opposite sides of this base are spaced flanges 4, and as shown, one end of each flange is wider than the other so that when the members are in position on the downward and outwardly flaring walls of the container, the free edges of these flanges are substantially vertical. Each of the flanges 4 is provided with a series of spaced notches 5, the notches of one flange being disposed opposite to the notches of the other. At the upper end of each member are a pair of laterally extended ears 6. Each member is fixed in position to the inner wall of the cask as by means of screws 7.

Fitting interchangeably in the slots 5 of each member are a pair of blocks 10, one of which is shown detached in Figure 5. Each block has a central shank portion 11 somewhat thinner than the width of the slots 5 so that the block may be slipped into position in any pair of oppositely disposed slots in the channel flanges. Beyond these flanges at each end the block 10 is formed with a head 12, one of these heads as shown being perforated at 13 for the reception of a cable or chain 14, the opposite end of which passes through one of the perforated ears 6 where it may be made fast. This permits the pair of blocks to be placed in position in any of the slots of the channel flanges but prevents them from becoming entirely separated from the channel members in which case they might become lost.

When the pair of blocks are placed in the adjacent pairs of slots in the channel walls they define therewith a socket indicated at 15 in Figure 3, the heads 12 extending laterally of the slots and preventing the disengagement of the blocks from the channel members by endwise movement laterally of these members. These sockets 15 may be formed at various heights along the channel members by inserting the blocks 10 into different vertically adjacent pairs of slots. Bridging the cross sectional area of the cask, or other container, is a plate 20 which may, if desired, by reticulated to permit flow of the liquid contained in the cask therethrough, but acting to hold beneath it all the meat which may be in the cask. The plate 20 should be of sufficient size to substantially close off the cross sectional area of the cask and as shown is provided at diametrically opposite points with ears 21 of sufficient size to fit between the flanges of the channel members and between the upper and lower blocks 10. After the meat has been put in the cask, both the blocks 10 are placed in the proper slots of one of the channel members to bring the plate 20 at the proper height, the lower block is placed in position in the opposite channel member, one ear 21 of the plate 20 is then inserted between the upper and lower blocks of the first mentioned channel member, and the other end is then pushed downwardly on to the lower block in the other channel member, whereupon the upper block for this member is placed in position above it. The plate is now released and the buoyancy of the meat causes the plate to push upwardly against the upper blocks on both sides. This plate, however, effectually holds the meat below the surface of the brine or other liquid, the surface of which comes somewhat above the plate. When it is desired to remove the plate to obtain access to the meat, it is pressed downwardly adjacent to one of the channel members, the upper block in this channel member is removed and the plate allowed to rise up at this end, whereupon it may be grasped and pulled out of engagement with the blocks and channel flanges of the opposite channel member.

In Figures 6 and 7 a slight modification has been shown in which the effective distance between the channel members may vary and yet permit the pressure plate to properly cooperate therewith. This may be done by mounting on the presser plate 30, as shown in Figure 6, a longitudinally slidable bar 31 having its end 32 projectable to the desired extent from the edge of the plate 30, diametrically opposite to the fixed lug 32. As shown this bar is held in position by means of integral straps 33 extending from the plate 30 and at its inner end the bar 31 has an upturned end 34 by which it may be grasped and manipulated. In order to prevent complete detachment of the bar 31 from the plate, it may be fixed thereto by means of a chain or cable, which as shown, has one end fixed to the upturned end 34 of the other end to one of the straps 33. Where this type of presser plate is employed it is not necessary that the inner walls of the channel-supporting members should be approximately vertical since the bar 32 may be adjusted to suit the distance between the blocks 10 even though this distance may vary lengthwise of the channel members. This is shown in Figure 7 in which the inner edges of the channel flanges 40 are inclined downwardly and outwardly and substantially in parallelism to the base 41 on each member which is fixed to the inner wall of the cask. With this form of presser plate the ear 32 is placed in the socket formed by the blocks 10 and the channel flanges in one of the members 40 and the end of the bar 32 may be projected to the proper extent to engage in the socket of the opposite channel member in case the ear 32$^a$ therebeneath is insufficient in length to enter this socket.

Having thus described certain embodiments of this invention it should be evident to those skilled in the art that many changes and modifications may be made therein without departing from its spirit or scope as defined by the appended claims.

I claim:

1. A device of the class described comprising a pair of channel-shaped members attachable in opposed relation within the upper portion of a container, a plate shaped to substantially bridge the internal cross sectional area of said container, and having elements engageable within the channels of said members, and means for retaining said elements in position.

2. A device of the class described comprising a pair of channel-shaped members attachable in opposed relation to the inner face of a container, the flanges of each of said members having oppositely arranged spaced slots therein, a pair of blocks for each member, each block engageable in any of the slots of its respective member, the blocks of each pair being spaced apart when engaged in the adjacent slots of their respective members, and a plate bridging said members and having elements engageable between the blocks of each pair.

3. A device of the class described comprising a pair of channel-shaped members attachable in opposed relation to the inner face of a container, the flanges of each of said members having oppositely arranged spaced slots therein, a pair of blocks for each member, each block engageable in any of the slots of its respective member, the blocks of each pair being spaced apart when engaged in the adjacent slots of their respective members, and a plate bridging said members and having elements engageable between the blocks of each pair and between the flanges of said members.

4. A device of the class described comprising a pair of channel-shaped members attachable in opposed relation to the inner face of a container, the flanges of each of said members being slotted inwardly from their free edges in opposed relation, a pair of blocks for each member each engageable in any pair of opposed slots of the corresponding member, and having heads wider than said slots outwardly of said flanges, each pair of blocks defining a socket between the flanges of the corresponding member when engaged in two pairs of slots, and a plate member bridging said container and having elements engageable in said sockets.

5. A device of the class described comprising a pair of channel-shaped members attachable in opposed relation to the inner face of a container, the flanges of each of said members being slotted inwardly from their free edges in opposed relation, a pair of blocks for each member each engageable in any pair of opposed slots of the corresponding member, and having heads wider than said slots outwardly of said flanges, each pair of blocks defining a socket between the flanges of the corresponding member when engaged in two pairs of slots, and a plate member bridging said container and having elements engageable in said sockets, said elements being adjustably spaced.

6. A device of the class described comprising a pair of members attachable in opposed relation to the upper portion of a container, a pair of elements engageable with each member in spaced relation, and a plate having an element engageable between the elements of each pair to be retained in position thereby.

7. A device of the class described comprising a pair of members attachable in opposed relation within the upper portion of a container, a pair of elements engageable with each member in spaced relation in any of a plurality of positions, and a plate having an element engageable between the elements of each pair to be retained in position thereby.

8. A device of the class described comprising a pair of members attachable to the wall of a container in opposed relation, elements associable with each member to define a socket adjustably positioned axially of said container, and a plate bridging said container and having elements extended within said sockets and retained in position axially of said container thereby.

9. A device of the class described comprising a pair of members attachable to the wall of a container in opposed relation, elements associable with each member to define a socket adjustably positioned axially of said container, a plate bridging said container and having elements extended within said sockets and retained in position axially of said container thereby, and means for fastening said elements to their respective members.

10. A device of the class described comprising a pair of members attachable to the wall of a container in opposed relation, elements associable with each member to define a socket adjustably positioned axially of said container, a plate bridging said container, said plate having an extension engageable in one of said sockets, and a bar slidably fixed to said plate to permit one end to be projected therefrom into the other socket.

11. A device of the class described comprising a pair of channel shaped members attachable in opposed relation to the wall of a container, a plate, and means engaging with the flanges of said members for holding said plate in position between said members.

12. A device of the class described comprising a pair of channel shaped members attachable in opposed relation to the wall of a container, a plate, and means selectively engageable in the slots of said flanges for holding said plate in position between said members.

13. A device of the class described comprising a pair of slotted members attachable in opposed relation to the wall of a container, a plate, means engaging selectively in the slots of said members for holding said plate in position between said members, and means for preventing disengagement of said engaging means and members by relative movement laterally of said members.

In testimony whereof I have affixed my signature.

GEORGE E. CLARK.